Patented Aug. 19, 1952

2,607,733

UNITED STATES PATENT OFFICE 2,607,733

HEAVY DUTY LUBRICANT

Dwight Raymond Oberlink, Michigan City, Ind., and William Carleton Fredericks, Evanston, Ill., assignors to Standard Oil Company, Chicago, Ill., a corporation of Indiana No Drawing. Application June 21, 1950,
Serial No. 169,534

7 Claims. (Cl. 252—37)

This invention relates to a lubricant, and more particularly to a lubricant for use under high temperatures and/or extremely high pressures.

Heretofore, the lubrication of metal surfaces which are at high temperatures due to the extremely high load pressures of operation, or due to the fact that the contacting metal surfaces are in a zone of high temperatures has been inefficient and generally unsatisfactory.

The lubrication of metal surfaces which are subjected to repeated or continuous contact with another metal surface under pressures of the order of 30,000 p. s. i., which pressure develops temperatures up to about 300° F., has posed a difficult problem in lubrication. An example of this problem is the lubrication of the rotating cams of a Bucyrus Monighan walking dragline which is used for strip mining in a soft or boggy ground. The cams of this machine actuate moving pontoons which enable the dragline to "walk." At particular points in the rotation of the cams, the cams rest on a bearing surface and support the entire weight of the dragline and at such times extremely high pressures are developed. The most commonly used type of lubricant for these bearing surfaces consists of a mixture of red lead and heavy lubricating oil. The pressures developed during operation however, are of such magnitude that most of this lubricant is squeezed out of the open bearing surface, leaving an insufficient film of lubricant, and necessitating very frequent application of the lubricant to insure at least the very minimum of lubrication. Almost all of the lubricant is wasted and considerable man hours are employed in the frequent application of this lubricant. The lubricating material should hence be one which is of sufficiently high viscosity on account of the high temperature conditions and extremely high shock loads. It must be one which is sufficiently adhesive to the metal surface. It must be in a form which is easily applied to the surface to be lubricated. The lubrication of many of the open or semi-open gears in steel mills pose the same problem. The lubricant must have a sufficiently high viscosity to be capable of lubricating under conditions of high temperature and heavy loads and yet the lubricant must be sufficiently adhesive so that it will not be thrown off the gears after each application. It must have water-resistant properties, and must be in a form which is easily applied.

One object of the invention is to provide lubricants which withstand severe operating conditions of high temperatures and shock loading. Another object is to provide lubricants having increased resistance to heat and water and increased adhesion to metal, adapting them for use under severe operating conditions. A further object is to provide lubricants which are easily applied and which are capable of withstanding extremely high pressures without being squeezed out from between the bearing surfaces. Other objects will become apparent from the description of the invention.

It has been found that these and other objects can be achieved by combining an asphalt with lead naphthenate. To facilitate its application under certain conditions, it is desirable to modify its viscosity by the addition of a diluent which is volatilized at a temperature of above about 150° F.

When producing the solid or semi-solid lubricant of this invention, the amount of lead naphthenate may be varied to meet changes in operating conditions to which the lubricant is subjected. A satisfactory solid or semi-solid lubricant for use under extremely high pressures is prepared by incorporating from about 12% to about 25%, and preferably from about 15% to about 20% lead naphthenate in an asphalt, preferably a blown asphalt. The lubricant of the above composition is solid or semi-solid at room temperatures.

If desired, the lubricant of this invention can be diluted with from about 5% to about 20%, and preferably from about 10% to about 15% of a normally liquid hydrocarbon diluent boiling above about 200° F. or a normally liquid chlorinated hydrocarbon having a boiling point above about 150° F., which reduces the viscosity of the lubricant and facilitates its application. Subsequent evaporation of the diluent leaves the residual coating of lubricant on the parts to be lubricated. An example of the use of the diluted form of this lubricant is the lubrication of steel mill machinery, such as table roll gears, driving pinion gears, and as a gear shield lubricant and the like, wherein the residual lubricant after the diluent has been evaporated must have a sufficient viscosity at temperatures up to 300° F. so that it will provide the necessary lubrication under high temperatures and pressures. The diluted lubricant has a Saybolt furol viscosity at 210° F. of between about 60 and about 100 seconds, preferably between about 65 and about 85 seconds. This diluted lubricant consists essentially of from about 5% to about 20% lead naphthenate and preferably from about 5% to about 12%, from about 5% to about 20% of a diluent, and preferably from about 10% to about 15%, and asphalt, preferably blown asphalt.

The lead naphthenate which is used is any of the products which are commonly made by reacting lead acetate with naphthenic acids or with alkali salts of naphthenic acids, or by any other methods.

The asphalt which is a component of the lubricant of this invention can be either a naturally occurring asphalt, an asphalt obtained as a residue in the distillation of certain types of petroleum or a blown asphalt obtained in the air blowing of residuum of the distillation products of certain types of petroleum. The physical characteristics of the asphalt can be varied depending upon the operating conditions to which the lubricant will be subjected. When producing the solid or semi-solid lubricant, the asphalt can have an ASTM penetration of between about 15 and about 110 under a load of 5 grams for 5 seconds at 77° F., and an ASTM softening point of between about 260° F. and about 110° F., preferably a penetration of between about 20 and about 85 under the above conditions, and a softening point of between about 245° F. and about 170° F. When using the solid or semi-solid lubricant of this invention for the lubrication of heavy machinery normally used outdoors, the asphalt component of this lubricant should be one having a higher softening point if the lubricant is to be used under hot climatic conditions, as for summer use; and the asphalt should be one having a lower softening point if the lubricant will be used in the winter or under cold climatic conditions.

The asphalt used in producing the diluted form of lubricant of this invention is preferably one having an ASTM penetration of between about 50 and about 110 under a load of 5 grams for 5 seconds at 77° F., and a softening point of between about 140° F. and 90° F., and preferably a penetration of between 85 and about 100, and a softening point of between about 120° F. and about 100° F. under the above conditions. The penetration of the asphalt wherever designated in the specification or claims is determined in accordance with the ASTM test D5-25; and the softening point of the asphalt wherever designated, is determined in accordance with ring and ball method ASTM D36-26.

The diluent used in producing the diluted form of lubricant of this invention can be aliphatic, cycloaliphatic or aromatic hydrocarbons boiling above about 200° F., or a chlorinated hydrocarbon boiling above about 150° F. An example of such diluent is an aromatic distillate having a distillation range of between about 220° F. and about 330° F., which has a kauri butanol gum number of between about 88 and about 98; preferably an aromatic hydrocarbon distillate having a distillation range of between about 275° F. and about 310° F., and having a kauri butanol gum number of between about 93 and about 97. A preferred diluent is an aromatic type distillate having a distillation range of between about 275° F. and about 308° F., and a kauri butanol gum number of 95.6, produced by the hydroforming of a naphtha by well known processes, such as for example, the process described in U. S. 2,335,596. Other hydrocarbon diluents can be used such as hydrocarbon oils having a Saybolt viscosity at 100° F. of between about 55 and about 100 seconds and a boiling point above about 200° F. Examples of other suitable hydrocarbon diluents are kerosenes, naphthas, oleum spirits, which have boiling points of above about 200° F. Examples of suitable chlorinated hydrocarbons are trichloroethylene, ethylene dichloride, chlorobenzene and other chlorinated hydrocarbons having a boiling point above about 150° F.

The product of this invention can be prepared in the following manner, although it is not necessary to adhere strictly to that procedure. The asphalt is introduced into a mixing vessel which is adapted to be heated, and the asphalt heated to a temperature at which it becomes molten. Lead naphthenate is gradually added and mixed with the asphalt and the product is mixed until it attains a uniform composition. It is partially cooled and then filled.

As illustrative of preferred compositions the following examples are included. It will be understood, however, that these examples are intended only as illustrating the invention and not as limiting its scope.

*Example I*

Parts by weight
Lead naphthenate ------------------------- 15
Blown asphalt (softening point—ring and ball ASTM D36-26, 175° F.; penetration at 77° F. ASTM D5-25, 80) ------------------------- 80
Pale oil viscosity Saybolt seconds Univ. at 100° F. of 80 seconds ------------------------- 5

The above composition is a semi-solid lubricant suitable for the lubrication of the cams of a "walking" type dragline under normal atmospheric temperature conditions. The inspection data on this composition are:

Softening point °F. ring and ball ASTM D36-26 ------------------------------ 140
Penetration at 77° F. ASTM D5-25 ---------- 90
Viscosity Saybolt seconds furol at 300° F. ASTM D88-44 ------------------------------ 160

A preferred composition for use under hot climatic conditions or for summer use is as follows:

*Example II*

Parts by weight
Lead naphthenate ------------------------- 20
Blown asphalt, softening point 245° F. ring and ball ASTM D36-26 ------------------- 80
Penetration of 30 at 77° F. ASTM D5-25.

The inspection data on this composition are:

Softening point °F. ring and ball ASTM D36-26 ------------------------------ 190
Penetration at 77° F. ASTM D5-25 ---------- 50
Viscosity Saybolt seconds furol at 300° F. ASTM D88-44 ------------------------------ 700

Since the above compositions are a semi-solid lubricant, it can be cut into pieces of the desired size and when used to lubricate the cams of a "walking" type dragline, the pieces need only be thrown onto the cam bearing surface ahead of the cam. The weight of the cam and dragline and the temperature developed by the weight of the dragline will squeeze and melt the semi-solid lubricant to a semi-liquid state as the cam revolves over the lubricant and thus lubricate the cam bearing surface. As the cam revolves and leaves the bearing surface the lubricant cools and returns to a semi-solid state, and the process is repeated upon each revolution of the cam. The ease of application of this lubricant is very advantageous in lubricating bearing surfaces subjected to extreme shock pressures.

The diluted type lubricant of this invention can be illustrated by the following compositions:

*Example III*

| | Parts by weight |
|---|---|
| Lead naphthenate | 8 |
| Blown asphalt, softening point 110° F. ring and ball ASTM D36–26 | 77 |
| Penetration of 90 at 77° F. ASTM D5–25. | |
| Pale oil, viscosity Saybolt seconds, Univ. at 110° F. of 80 seconds | 2 |
| Hydroformer distillate, distillation range 270–310° F | 13 |
| Kauri Butanol Gum No. 95.6. | |

The inspection data on this composition are:

Saybolt furol viscosity at 210° F_____ 75

The method of manufacture of the diluted lubricant is similar to that employed in manufacturing the solid or semi-solid lubricant of this invention, except that care must be observed in controlling the temperature so as to avoid evaporating the diluent. The asphalt is introduced into a mixing vessel which is adapted to be heated and the asphalt is then heated to a temperature at which it becomes molten. The lead naphthenate is then introduced into the asphalt gradually, accompanied by stirring until the composition becomes uniform. The composition is then cooled to a temperature lower than that at which the diluent would evaporate rapidly, and the diluent is gradually added and stirred into the composition until a uniform product results. The product is then cooled and filled. The process of manufacture can be varied, for example, the lead naphthenate may be dispersed into the diluent and the mixture then added to the molten asphalt. The temperatures employed in this latter method must be controlled, however, to prevent substantial evaporation of the diluent.

Additional characteristics can be obtained by adding fillers, such as talc, asbestos, or graphite to the molten asphaltic composition.

All percentages expressed herein and in the appended claims are weight percentages.

It is apparent that many widely different embodiments of this invention may be made without departing from the spirit and scope thereof, and therefore it is not to be limited except as indicated in the appended claims.

We claim:

1. A lubricant consisting essentially of from about 12% to about 25% of lead naphthenate and from about 88% to about 75% of asphalt.

2. The lubricant of claim 1 wherein the asphalt is a blown asphalt having a penetration of between about 15 and about 110 at 77° F. and a softening point of between about 260° F. and about 110° F.

3. A lubricant having a Saybolt furol viscosity at 210° F. of between about 60 and about 100, consisting essentially of from about 5% to about 25% of lead naphthenate, from about 0% to about 20% of a diluent selected from the group consisting of a normally liquid hydrocarbon diluent boiling above about 200° F., and a normally liquid chlorinated hydrocarbon boiling above about 150° F., and the remainder asphalt.

4. The lubricant of claim 3 wherein the hydrocarbon diluent has a distillation range between about 220° F. and about 330° F., and a kauri butanol gum number of between about 88 and about 98.

5. The lubricant of claim 3 wherein the diluent is trichloroethylene.

6. The lubricant of claim 3 wherein the asphalt has a penetration of between about 50 and about 100 at 77° F., and a softening point of between about 140° F. and about 90° F.

7. A lubricant having a Saybolt furol viscosity at 210° F. of between about 65 and about 85, consisting essentially of from about 7% to about 12% of lead naphthenate, from about 10% to about 15% of an hydrocarbon diluent boiling above about 200° F. and the remainder blown asphalt.

DWIGHT RAYMOND OBERLINK.
WILLIAM CARLETON FREDERICKS.

REFERENCES CITED

The following references are of record in the file of this patent:

UNITED STATES PATENTS

| Number | Name | Date |
|---|---|---|
| 2,292,672 | Swenson | Aug. 11, 1942 |
| 2,388,083 | Reswick | Oct. 30, 1945 |
| 2,391,113 | Zimmer et al. | Dec. 18, 1945 |